Feb. 23, 1954 E. W. DETJEN Re. 23,788

METHOD OF WASHING ALUMINUM KITCHEN UTENSILS

Original Filed July 31, 1951 2 Sheets-Sheet 1

INVENTOR
EDGAR W. DETJEN

BY Young & Wright

ATTORNEYS

METHOD OF WASHING ALUMINUM KITCHEN UTENSILS

Original Filed July 31, 1951 2 Sheets-Sheet 2

INVENTOR
EDGAR W. DETJEN

BY

Young & Wright

ATTORNEYS

Reissued Feb. 23, 1954 Re. 23,788

UNITED STATES PATENT OFFICE 23,788

METHOD OF WASHING ALUMINUM KITCHEN UTENSILS

Edgar W. Detjen, Kiel, Wis., assignor to Stoelting Brothers Company, Kiel, Wis., a corporation Original No. 2,633,437, dated March 31, 1953, Serial No. 239,520, July 31, 1951. Application for reissue October 14, 1953, Serial No. 386,145

2 Claims. (Cl. 134—25)

Matter enclosed in heavy brackets [ ] appears in the original patent but forms no part of this reissue specification; matter printed in italics indicates the additions made by reissue.

This invention appertains to industrial washing processes for cleaning metal objects, and more particularly to a novel method or process of washing and drying aluminum kitchen utensils and like hollow ware, as the same leave the forming or drawing machines.

During the fabrication of aluminum utensils, the same become soiled with grease, aluminum dust and the like, and it is necessary to thoroughly wash the same before the utensils leave the factory. Some are wholly cleaned by hand, and others are partially machine-cleaned and finished by hand. Obviously, this is an expensive and time consuming method.

It is necessary and advisable to place in the stores a bright, clean utensil, so that the same will be pleasing to the eye of a prospective purchaser.

One of the difficulties in producing a nice appearing aluminum utensil for sale, is that the same ordinarily has so-called water spots or blemishes thereon. To my knowledge, there is no means for giving the utensils a complete machine wash, which entirely eliminates these blemishes.

It is, therefore, one of the primary objects of my present invention to provide an improved process or method for giving aluminum kitchen and like utensils, a complete machine wash, for producing bright, unblemished utensils.

Another salient object of my invention is the provision of a method or process for machine washing aluminum kitchen and like utensils, which consists in, first, subjecting the utensils to a chemical bath for removing the aluminum dust and grease; second, rinsing the utensils with clear water, and third, subjecting the utensils to a final wash of a [purified] *deionized* water containing no [, or a minimum amount of,] impurities, (which produce blemishes), *but which may contain a wetting agent*, for breaking the surface tension of the water to insure uniform draining of the utensils, and then immediately drying the utensils.

With these and other objects in view, the invention consists in the novel construction, arrangement and formation of parts, as will be hereinafter more specifically described and claimed, and illustrated in the accompanying drawings, in which drawings, Figure 1 is a perspective view of a machine for washing, cleaning and drying utensils according to my novel method, the view being of a diagrammatic nature.

Referring to the drawings in detail, wherein similar reference characters designate corresponding parts throughout the several views, the letter M generally indicates a machine for carrying out the novel method and process for washing, cleaning, and drying kitchen utensils or like hollow ware U.

Figure 1:
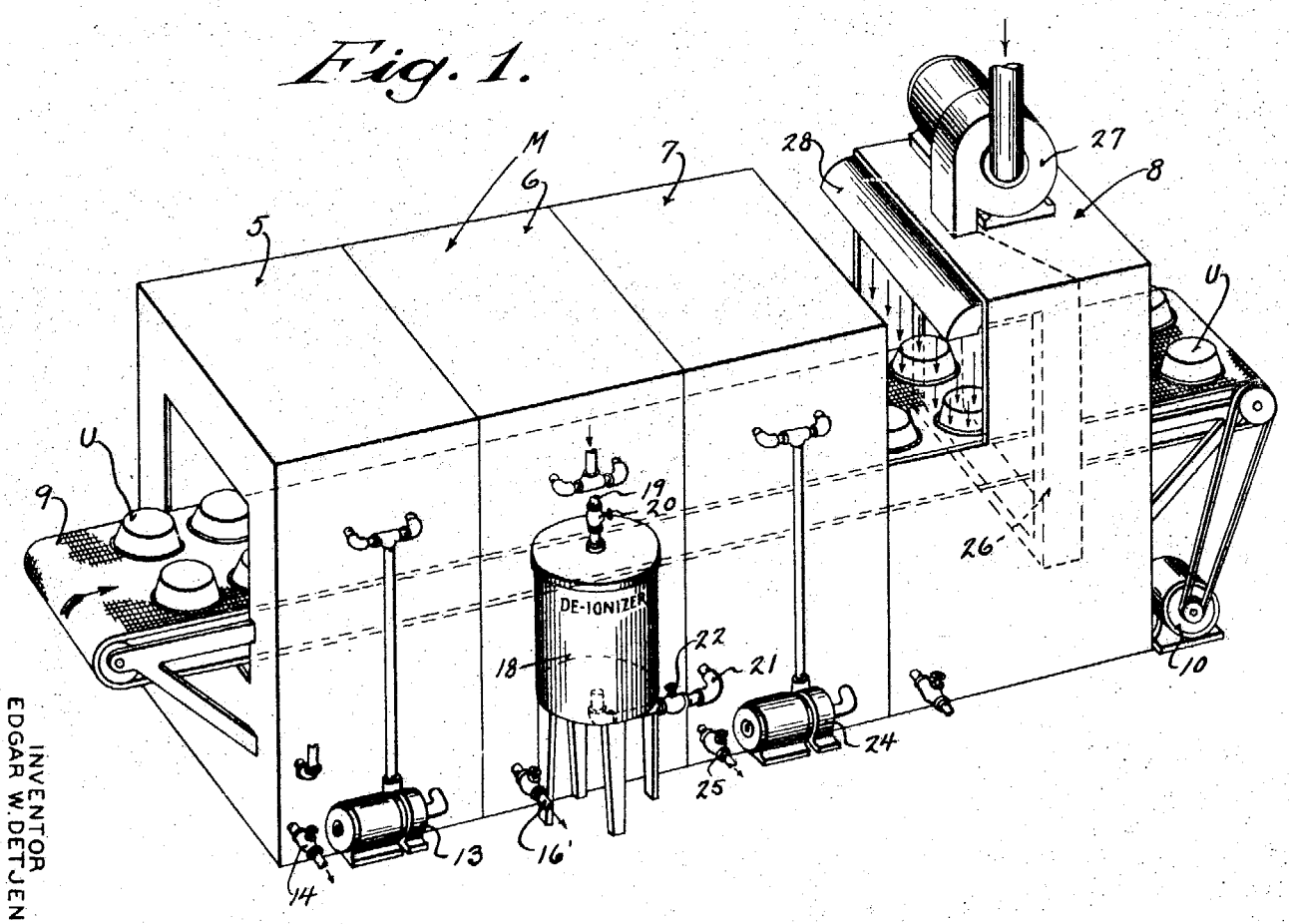
Figure 2:
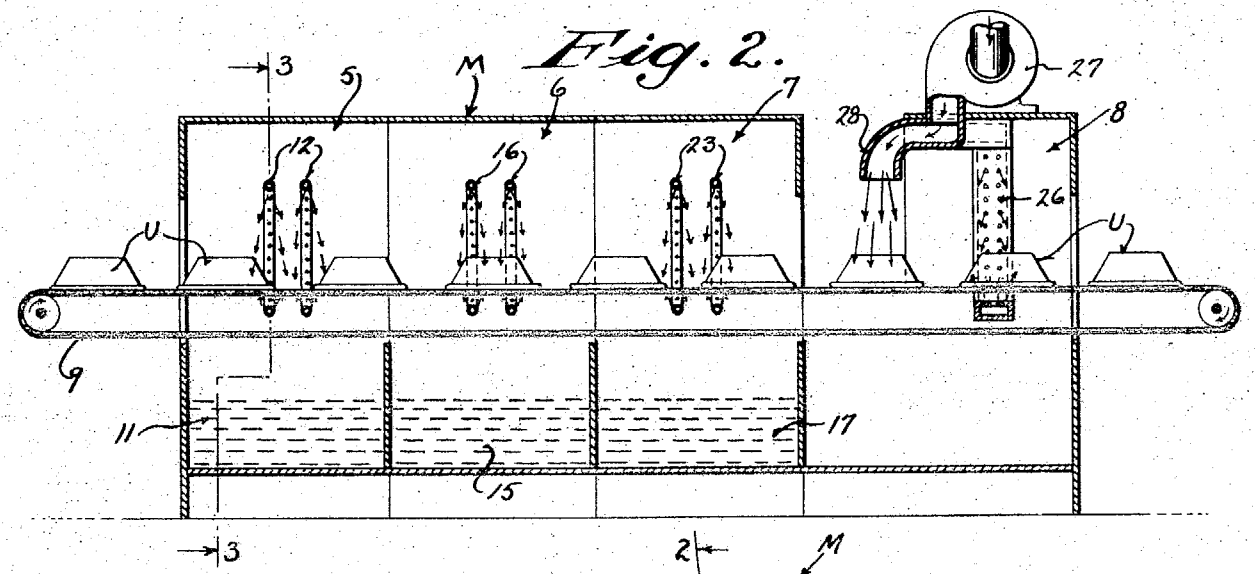
Figure 2 is a central longitudinal sectional view through the machine, the section being taken on the line 2—2 of Figure 3 looking in the direction of the arrows, this view also being of a diagrammatic nature.
Figure 3:
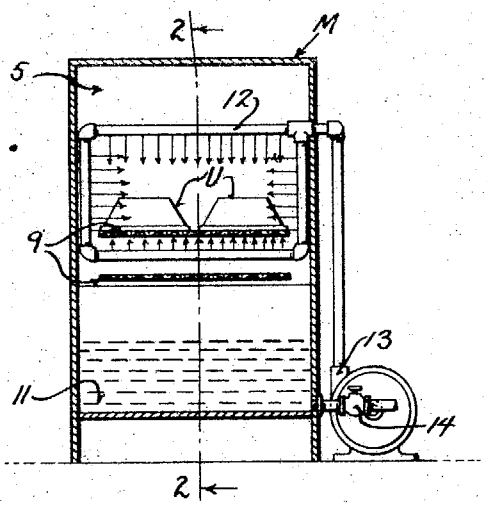
Figure 3 is a transverse sectional view through the machine, taken on the line 3—3 of Figure 2, looking in the direction of the arrows.

The utensils U can be of any character or type, such as pots and pans, percolator bodies, and the like.

The machine M includes a chemical washing and degreasing unit 5, a clear water rinse unit 6, a [purified] *deionized* water and alcohol rinse unit 7, and a drying unit 8.

Extending through the machine is an endless conveyor belt 9 for carrying the utensils through the various units of the machine in proper sequence. The belt 9, is driven at a desired rate of speed in any preferred way, such as from an electric motor 10. The belt is formed from open work material so that sprays of water can be impinged on the inner faces of the utensils, as well as around the tops and sides thereof.

The chemical degreaser and washing unit 5, includes a tank 11, for the chemical, which may or may not be heated. The chemical from the tank 11 is forced through a series of spraying members 12 by means of a motor driven pump 13. A drain 14, can also be provided for this tank 11. The specific pump, spraying means and chemical utilized, form no part of the present invention. The chemical washing unit, is so built as to remove all grease from the utensils, as well as aluminum dust and other debris.

The clear water rinse unit 6, is employed for thoroughly washing the utensils to remove the chemical solution therefrom, and to further carry away any debris that might be remaining on the utensils. The unit 6, also includes a tank 15, for the reception of water obtained from any suitable source of supply, such as a city water main. The water from the main can be directly supplied to a series of spraying members 16. If the water is not under sufficient pressure, a motor driven pump can be utilized. The tank 15, is provided with a drain 16', which can lead directly to a sewer.

As brought out in the objects of this specification, where clear water from a water main or well is utilized, for rinsing water, spots and blemishes appear on the utensils after drying. This is caused from the impurities in the water and from the fact that the water does not drain uniformly from the receptacles, but tends to run off the utensils in rivulets or drops. This concentration of water increases the depositing of the impurities from the water on the utensils.

Hence, as heretofore set out, the method includes a rinse of a certain character for washing the clear water off of the utensils, and to distribute the water over the utensils in such a way that there will be a uniform draining. Unit 7 accomplishes this purpose. Unit 7, also includes a tank 17, which is filled with chemically purified water. The water utilized is purified to a high degree to remove all impurities therefrom, and water from a city main, or other source of supply can be forced through a deionizer unit 18 of a type now found in the open market. The inlet of the unit is coupled to a supply pipe 19, and a valve 20 is incorporated in the pipe to control the flow of water into the deionizer. The outlet end of the deionizer 18 is connected to the tank 17 by a pipe 21, and the flow of purified water through the pipe can be controlled by a valve 22. Arranged within the unit 7 are a series of sprays or headers 23, for subjecting all faces of the utensils to the [purified] *deionized* water rinse and the water from the tank 17, is forced under pressure to the sprays 23, by means of a motor driven pump 24. As also heretofore brought out, it is necessary to employ [purified] *deionized* water, as it is by the use of this water, that I am enabled to eliminate all blemishes or water spots on the utensils. If desirable, an element can be used with this [purified] *deionized* water to break the surface tension of the water from the utensils. A certain proportion of alcohol, or other equivalent wetting agent, can be incorporated in the water. This, however, can be added to the tank from time to time, as the strength thereof decreases, and the tank when necessary, can be drained, by means of a valve controlled outlet pipe 25.

The drying unit 8, is employed for quickly subjecting the utensils to blasts of hot air, as the utensils leave the unit 7, so as to facilitate the uniform drying of the utensils. Hence, the drying unit 8, has incorporated therein, a transversely extending hollow manifold 26, which encompasses the belt 9 and this manifold is provided with a series of outlet openings, facing toward all faces of the utensils. Air under pressure is supplied to the manifold 6, by means of a motor driven air impeller 27. The air can be heated in any preferred way. In some instances, there may be small puddles left on the bottoms of the inverted receptacles, and to spread the water out from the puddles, I employ an air nozzle 28, at the entrance of the unit 9. This nozzle points directly down toward the receptacles and communicates with the outlet of the air impeller 27.

From the foregoing description, it can be seen that my method of washing and cleaning aluminum utensils consists in first, degreasing and washing the utensils in unit 5; second rinsing the chemical off by means of clear water in unit 6; third, completely rinsing the utensils by means of a [purified] *deionized* water bath, including a water surface tension breaking element, and, fourth, immediately drying the utensils. By my method, I can quickly and efficiently machine wash aluminum utensils without water blemishes, and give the utensils a bright appearance which will attract the eye of prospective purchasers.

[In the claim, where the term distilled water is utilized, it is to be understood that I mean any purified water from which impurities have been removed.]

*The advantage of deionized water is that it is free of all dissolved mineral solids. After the final rinse with deionized water and when the article is heat dried, all of the water evaporates leaving a clean unspotted metal finish. If the final rinse water contains solids, these would be left behind in the form of water spots, which are actually deposits of sodium chloride, calcium carbonate, magnesium sulphate and other compounds which occur naturally in water. Ordinary purified water contains mineral solids, with the exception, probably of distilled water. The cost of distilled water for continuous commercial purposes renders the use thereof prohibitive for my purpose. In view of the fact that deionized water is free of all impurities, I find that in most instances I do not have to use alcohol therewith.*

Also it is to be understood that where I use the term alcohol in the claims, such term also includes any equivalent element.

Changes in details may be made without departing from the spirit or the scope of this invention, but what I claim as new is:

1. The method of washing aluminum kitchen utensils to produce a bright; uniform clean appearance, which consists, first, in subjecting the utensils to a chemical bath capable of removing grease and aluminum dust; second, subjecting the utensils to a clear water rinse to remove the chemical; third, subjecting the utensils to a [distilled] *deionized* water and alcohol bath to remove water blemishes and to evenly distribute the water over the receptacles and finally, immediately drying the utensils after the same have passed through the *deionized* [distilled] water and alcohol bath.

2. *The method of washing aluminum kitchen utensils to produce a bright uniform clean appearance, which consists, first, in subjecting the utensils to a chemical bath capable of removing grease and aluminum dust; second, subjecting the utensils to a clear water rinse to remove the chemical; third, subjecting the utensils to a deionized water bath to remove water blemishes and, finally, immediately drying the utensils after the same have been passed through the deionized water bath.*

EDGAR W. DETJEN.

References Cited in the file of this patent or the original patent

UNITED STATES PATENTS

| Number | Name | Date |
|---|---|---|
| 1,554,483 | Bailey | Sept. 22, 1925 |
| 2,236,445 | Pfeiffer | Mar. 25, 1941 |
| 2,399,134 | Miller | Apr. 23, 1946 |
| 2,541,901 | Zademach | Feb. 13, 1951 |